United States Patent

Stich

[15] 3,700,919
[45] Oct. 24, 1972

[54] PHASE SHIFT DETECTOR
[72] Inventor: Frederick A. Stich, Milwaukee, Wis.
[73] Assignee: Allis-Chalmers Manufacturing Company, Milwaukee, Wis.
[22] Filed: Feb. 22, 1971
[21] Appl. No.: 117,342

[52] U.S. Cl. .................307/232, 307/127, 317/27, 317/43, 317/48, 324/83 D, 324/133, 328/110, 340/253 Y
[51] Int. Cl. ..................G01r 25/00, H03d 13/00
[58] Field of Search.............307/232, 92, 236, 127; 328/109, 110, 133; 317/27, 43, 48; 340/253 Y; 324/83 D, 83 Q, 83 FE, 133

[56] References Cited

UNITED STATES PATENTS

| | | | |
|---|---|---|---|
| 2,196,871 | 4/1940 | Minneci | 307/19 |
| 3,009,107 | 11/1961 | Aspden et al. | 324/83 D |
| 3,518,491 | 6/1970 | Downs | 317/43 X |

OTHER PUBLICATIONS

O' Brien, RCA Technical Notes 799, Integrating Phase Meter, Oct. 18, 1968, pages 1–3.

*Primary Examiner*—Stanley T. Krawczewicz
*Attorney*—Lee H. Kaiser, Robert B. Benson and Thomas F. Kirby

[57] ABSTRACT

A reverse power flow relay having high load current sensitivity over a wide power factor range receives input signals representative of the voltage on and the current in a power line, shifts the phase of the voltage signal 90°, and has a first high-gain operational amplifier for deriving rectangular positive voltage pulses from the phase-shifted signal, a differentiator for deriving a sharp voltage pulse at the leading edge of each rectangular voltage pulse when the voltage input signal crosses the zero axis, a second high-gain operational amplifier for deriving first rectangular positive current pulses from the current input signal, an inverter for deriving second rectangular positive current pulses shifted 180° in phase from the first rectangular current pulses, a NAND gate logic circuit for providing a first output when the sharp voltage pulses coincide with the first rectangular current pulses, thereby indicating forward power flow, and for providing a second output when the sharp voltage pulses coincide with the second rectangular current pulses, thereby indicating reverse power flow, and a latch circuit operated by the NAND gate logic circuit.

11 Claims, 5 Drawing Figures

REVERSE POWER FLOW DETECTOR BLOCK DIAGRAM

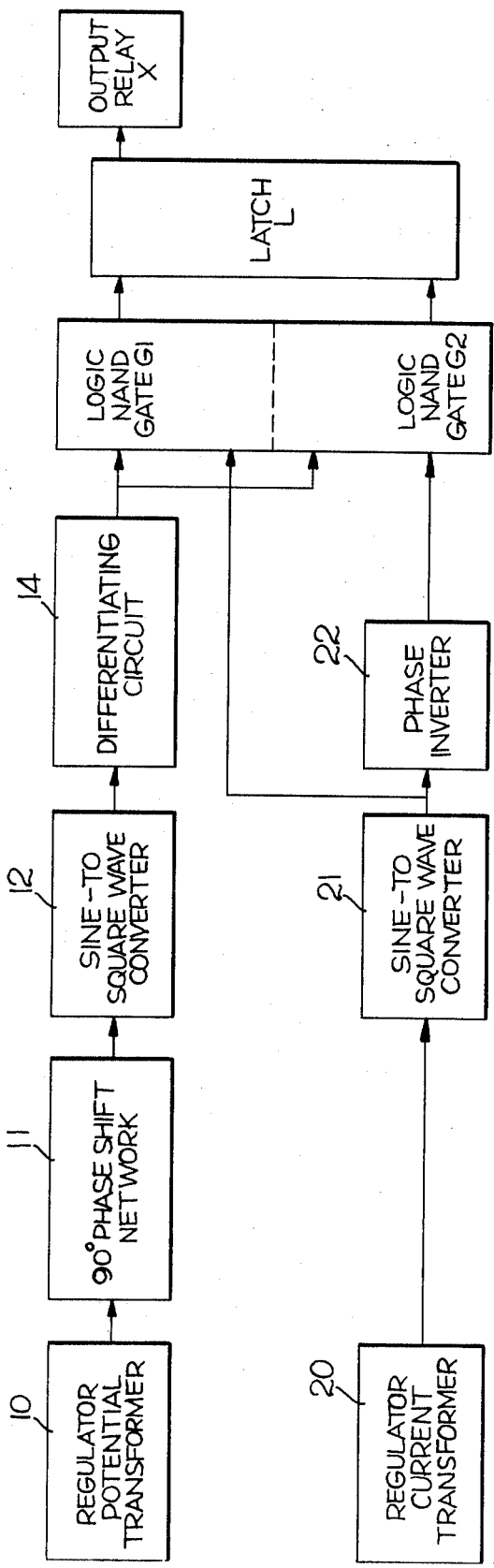
Fig. 1 — REVERSE POWER FLOW DETECTOR BLOCK DIAGRAM

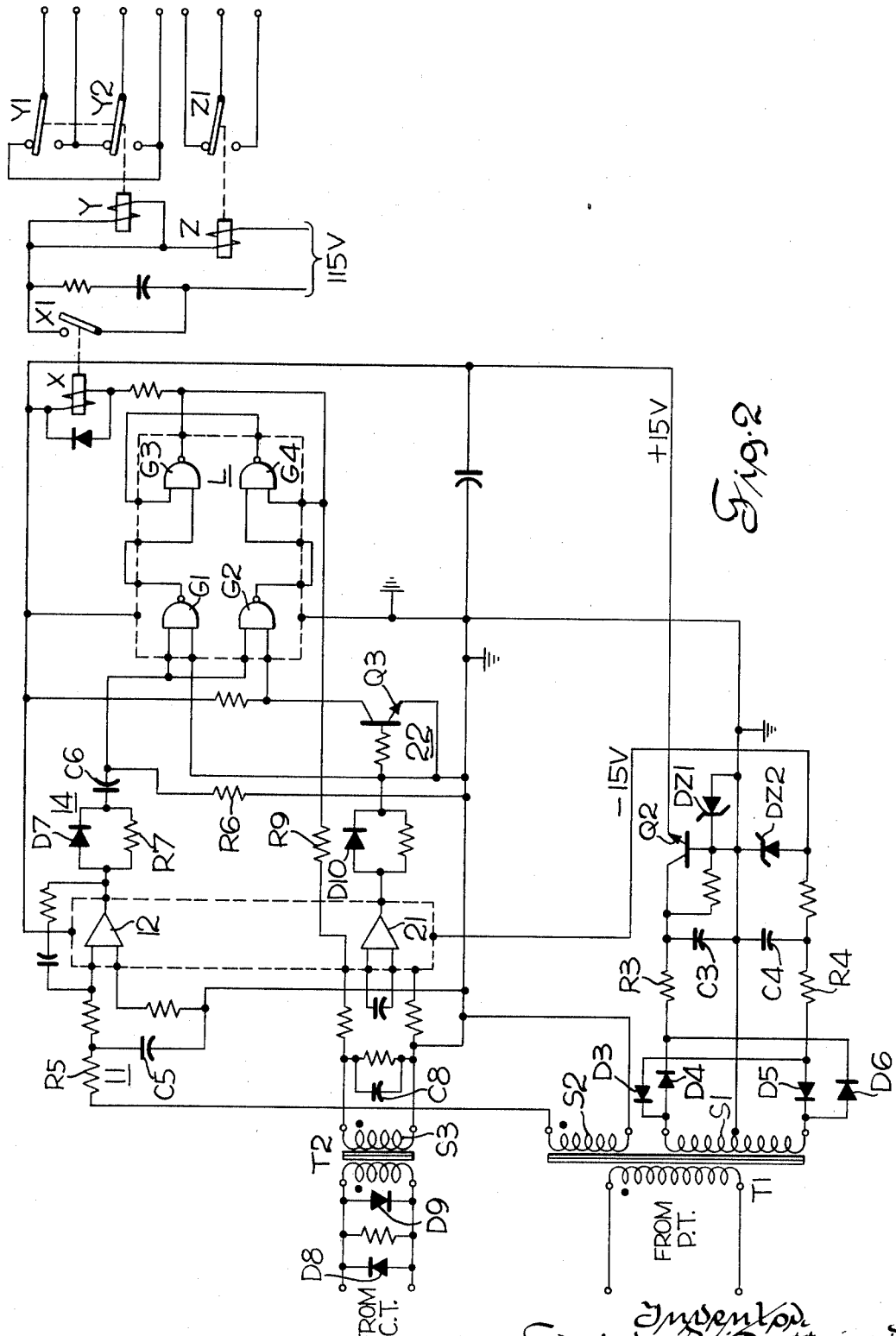

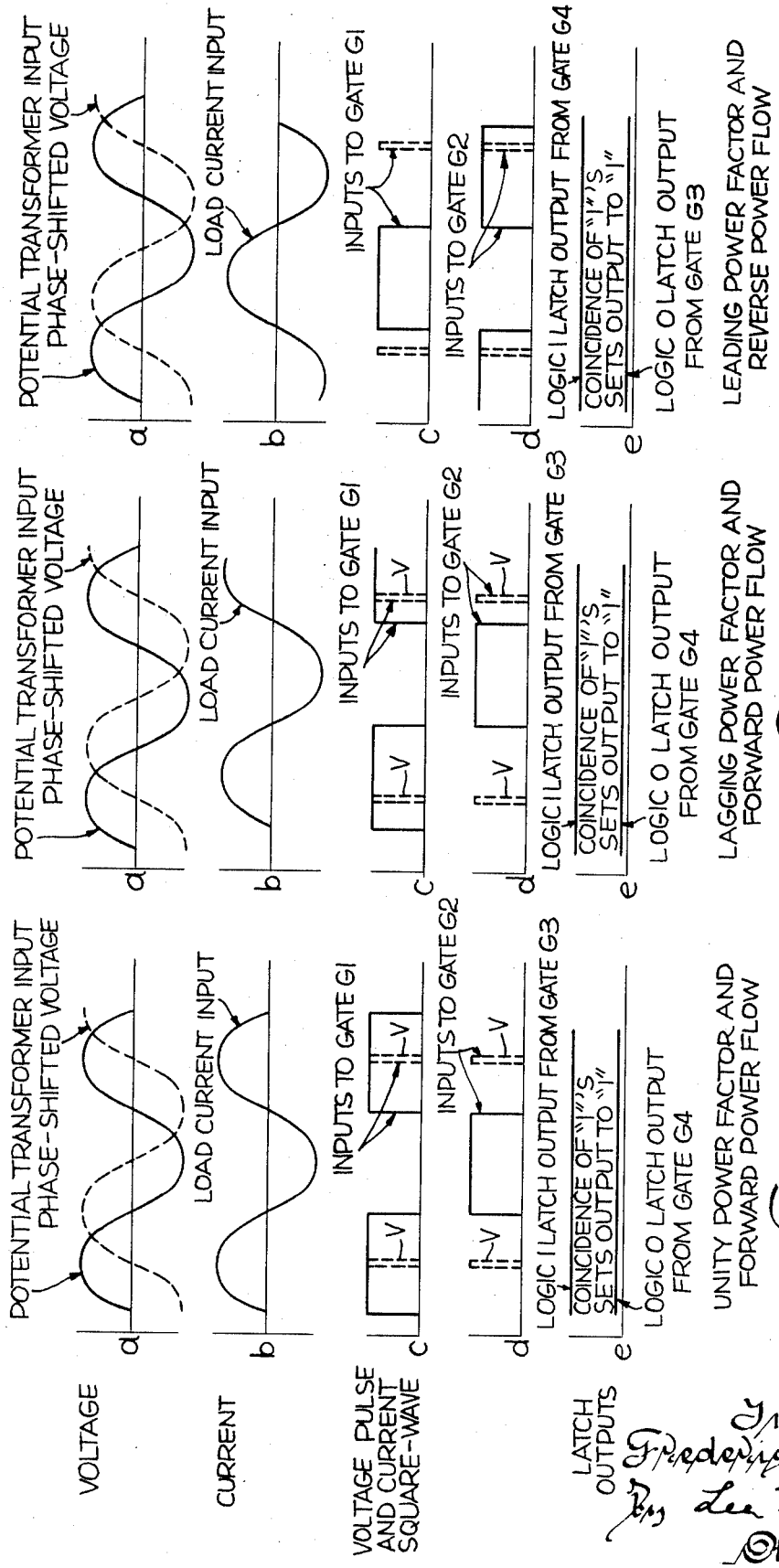

PHASE SHIFT DETECTOR

This invention relates to the detection of the direction of flow of alternating current electrical power and in particular to a static reverse power flow detector particularly adapted for use in a voltage regulator.

BACKGROUND OF THE INVENTION

The existence of alternate sources of generation and interties in alternating current electrical power systems introduces the possibility of power flow in either of two directions in a power line during peak loading, routine maintenance, or during emergencies. A voltage regulator on such a power system requires a reverse power flow detector. A distribution voltage regulator usually controls the voltage on the load side of the regulator by a tapped buck/boost winding in series with the line. The regulator may have a 100 percent exciting winding in shunt with the line on the source side and a 10 percent buck/boost winding on the load side in series with the line. The 10 percent series winding is selectively connected by a reversing switch in bucking or boosting relation to the shunt winding and has taps connected to a tap changer which provides the ability to change the effective turns ratio from input to output plus or minus 10 percent in 32 steps of ⅝ percent voltage.

The control for the regulator senses the voltage on the output, or load side of the regulator by means of a potential transformer. Under circumstances where the power flow through the regulator is reversed, the potential transformer senses the input, or source voltage. If the voltage is high at the time, the regulator would subtract turns at the source side of the regulator and thus effectively increase the voltage at the output of the regulator even further. In order to make the distribution regulator bidirectional, a reverse power flow detector and a potential transformer on the source side must be added.

PRIOR ART

Electromechanical induction disk reverse power relays have been used with voltage regulators, for example, as disclosed in U. S. Pat. No. 2,196,871 to S. Minneci, but they have such disadvantages as:

1. the current range over which the reverse power relay may be loaded is much lower than that of the regulator;
2. short time overload capacity is low;
3. minimum sensitivity varies with power factor;
4. response is only accurate at a single frequency;
5. hunting and excessive relay contact arcing may occur about the point of minimum sensitivity; and
6. frequent maintenance and adjustment may be required.

Transistorized reverse power flow detectors are also known that are a substantial improvement over electromechanical induction disk relays, but known transistorized reverse power detectors are not entirely satisfactory in that: (a) sensitivity varies with power factor; (b) the detector does not operate properly if the power factor is outside of the range of approximately 0.5 lag to 0.5 lead; (c) the minimum sensitivity is relatively high; and (d) the detector must be readjusted to operate properly if a change in frequency occurs. The importance of such limitations becomes apparent when it is considered that a power reversal is usually indicative of an abnormal operating condition. Thus it is impossible under such limitations to accurately predict at what percent load or power factor a feeder would be operating at the time of power reversal. A relatively insensitive reverse power flow detector may not operate when only a small section of a feeder, normally on the source side of the regulator, is switched to an alternate source. Similarly a reverse power flow detector which operates over a limited power factor range may not respond if such small section of feeder, normally on the source side of the regulator, contains a capacitor bank and is switched to an alternate source.

OBJECTS OF THE INVENTION

Therefore, it is an object of the invention to provide an improved reverse power flow detector which operates over a much greater power factor range than known devices. Another object is to provide such a reverse power flow detector which is much more sensitive than prior art detectors and is operable over a greater frequency range than known detectors. A still further object of the invention is to provide such a reverse power flow detector which does not require adjustment to compensate for change in power line frequency. Still another object is to provide such an improved reverse power flow detector which is less expensive than prior art detectors, which includes fewer components than known devices, which is operable without damage at higher temperatures than known detectors, and which has a higher degree of reliability than known devices.

These and other objects and advantages of the invention will be more readily apparent from the following detailed description when considered in conjunction with the accompanying drawing wherein:

FIG. 1 is a block diagram of a reverse power flow detector embodying the invention;

FIG. 2 is a schematic circuit diagram of a preferred embodiment of the invention; and FIGS. 3, 4 and 5 show waveforms in the circuit of FIG. 2 respectively for: (a) unity power factor and forward power flow; (b) lagging power factor and forward power flow; and (c) leading power factor and reverse power flow.

PRINCIPLE OF THE INVENTION

The reverse power flow detector of the invention monitors the power flow in an alternating current line and presents an output indicating either forward or reverse power flow. The detector of the invention is particularly adapted to provide automatic switching of the sensing and motor connections of a distribution voltage regulator so that the regulator may control either the load side or the source side, depending upon the direction of power flow. The reverse power flow detector is energized from the potential transformer 10 on the load side of the regulator, shown in block form in FIG. 1, which provides power for the detector and information about the phase of the voltage. The phase of the voltage input signal derived from potential transformer 10 is shifted 90° in phase shift network 11, the phase-shifted wave is converted to a square wave in sine-to-square wave converter 12, and the resulting square wave is differentiated in a differentiating circuit 14 to derive a short pulse at the positive-going zero crossings of the square wave.

A second input to the reverse power flow detector is obtained from the load current transformer 20 of the regulator and provides information concerning the phase of the load current. The signal derived from current regulator 20 is converted to a square wave in sine-to-square wave converter circuit 21 and inverted in a phase inverter circuit 22. The short voltage pulse from differentiating circuit 14 and the non-inverted rectangular current pulse from converter circuit 21 are inputs to a first NAND logic gate G1. The coincidence of the short voltage pulse and the rectangular current pulse indicates forward power flow and provides a logic 0 output from logic NAND date G1 which sets a latch circuit L to a state indicating forward power flow and operates a relay R.

The short voltage pulse from the differentiating circuit 14 and the inverted rectangular current pulse from phase inverter 22 are inputs to a second NAND logic gate G2, and the coincidence of the short voltage pulse and the inverted rectangular current pulse provide a logic 0 output from NAND gate G2 which resets latch circuit L to a state indicating reverse power flow and releases relay R.

DETAILED DESCRIPTION

The preferred embodiment of the reverse power flow detector is shown in FIG. 2 and preferably includes a first isolating transformer T1 which receives the input from the regulator potential transformer 10 and a second isolating transformer T2 which receives the input from the load current transformer 20 of the regulator. Isolating transformer T1 also serves as the power supply transformer and has a center-tapped secondary winding S1 which energizes a conventional full wave rectifier including diodes D3, D4, D5 and D6 that produces a plus 15 and a minus 15 volt power supply which respectively are filtered by RC circuits comprising resistance R3 and capacitor C3 and resistance R4 and capacitor C4. The plus 15 volt supply is series regulated by a transistor Q2 referenced to a zener diode DZ1, and the minus 15 volt supply is shunt regulated by a zener diode DZ2.

In order to maintain phase accuracy, the secondary winding S2 of the isolating transformer T1, which is the potential input to the detection circuit, is isolated from the power supply secondary winding S1. The voltage signal from secondary winding S2 is phase-shifted to nearly 90° by phase-shift network 11 including resistor R5 and capacitor C5. Such 90° phase shift assures that the power flow direction can be detected at very low power factors when the phase between voltage and current approaches 90°. The phase-shifted potential signal is converted to a square wave in sine-to-square wave converter 12 which preferably is an operational amplifier whose gain is so high that its output is limited to a square wave. The negative half cycle of the voltage square wave is blocked by a diode D7, and the rising edge of the positive half cycle of the voltage square wave is differentiated by differentiating circuit 14 including a capacitor C6 and a resistor R6 into a sharp pulse $v$ (See FIG. 3c) across resistor R6. A resistor R7 in shunt to diode D7 is a long time constant discharge path for capacitor C6, and the slow discharge of capacitor C6 inhibits higher frequency pulses from being generated. The short pulse $v$ derived across resistance R6 is the A input to a logic NAND gate G1 and also the A input to a logic NAND gate G2.

The current signal obtained from the load current transformer 20 of the regulator is isolated from the reverse power flow detector by auxiliary current transformer T2 which preferably has a 1:1 turns ratio. Excess current is shunted from the primary winding of isolating transformer T2 by diodes D8 and D9 connected in opposite polarity across the primary winding in order to keep the current through isolating transformer T2 small. Phase shift caused by isolating transformer T2 and noise from the load current transformer 20 of the regulator is reduced by a low-Q band pass filter comprising a capacitor C8 connected across the secondary winding S3 of transformer T2. This low Q tuned circuit permits the operation of the reverse power flow detector to be satisfactory to 50Hz.

The AC current signal from secondary winding S3 is converted to a square wave by sine-to-square wave generator 21 which preferably is a high gain operational amplifier. The positive half cycles of the current square wave output from operational amplifier 21 are fed through a diode D10 to the B input of NAND gate G1 while the negative half cycles are blocked by diode D10.

The positive half cycles of the current square wave are inverted in phase inverter circuit 22 comprising a transistor Q3 so that the output signal on the collector of transistor Q3, which is the B input to a logic NAND gate G2, is a positive rectangular current pulse shifted in phase 180° from the non-inverted rectangular current pulse which is the B input to NAND gate G1.

Gates G1 and G2 perform the logical NAND function $\overline{AB}$. Latch circuit L comprises first and second logic NAND gates G3 and G4. The output of gate G4 is the A input to gate G3, and the B input to G3 is the output of gate G1. The output of gate G2 is the A input to gate G4 of latch L. The output of NAND gate G3 is the B input to NAND gate G4 and is also connected to one side of an output reed relay $x$ having its other side connected to the plus 15 volt power supply.

FIGS. 3, 4 and 5 illustrate waveforms for typical voltage and current conditions in the power line encountered by the reverse power flow detector. FIGS. 3a and 3b respectively show the voltage and current signals in phase for the condition of unity power factor and forward current flow in the power line. The solid line voltage wave shown in FIG. 3a is the reference point in time, and the dashed voltage wave in FIG. 3a represents the voltage waveform output from phase shift network 11 after it has been shifted 90° in phase. The non-inverted and inverted current square wave outputs from diode D10 and transistor Q3 respectively(which are the B inputs to gates G1 and G2 respectively) are illustrated in FIGS. 3c and 3d. The positive-going zero crossings of the phase-shifted voltage wave generate the short pulses $v$ in differentiator circuit 14 which are the A inputs to NAND gates G1 and G2 and are shown in dashed lines in FIGS. 3c and 3d. For forward power flow, the voltage pulse $v$ will coincide with the positive portion of the non-inverted current square wave, as shown in FIG. 3c, and forms a zero output pulse from NAND gate G1. The logic 0 output pulse from NAND gate G1 sets latch L with logic 1 at the output of NAND gate G3 and logic 0 at the output of NAND gate G4, as illustrated in FIGS. 3e. In this condition with logic 1 on the output of gate G3 of latch L, relay $x$ is not operated.

FIG. 4 illustrates the condition where the power factor differs from unity, the load current shown in FIG. 4b lags the voltage shown in FIG. 4a, and the average power flow is still forward. The two voltage curves shown in FIG. 4a and the dotted voltage pulses v shown in FIGS. 4c and 4d maintain the same position as in FIG. 3. Inasmuch as the load current is lagging the voltage, the current square waves shown in FIGS. 4c and 4d are illustrated with the same lagging phase displacement. The voltage pulse v is still coincident with the non-inverted current square wave input to NAND gate G1, the state of latch L is the same as represented in FIG. 3, and relay R is not operated. FIG. 4 illustrates the necessity of shifting the voltage wave by 90° to maintain coincidence of the voltage pulse and the current square wave for lagging power and further illustrates that the range of power factor of the reverse power flow of the detector exceeds from 0.1 lag to 0.1 lead.

FIG. 5 illustrates the condition wherein the phase lag of the current shown in FIG. 5b has been increased past 90° so the direction of the average power flow is reversed from that illustrated in FIGS. 3 and 4 and the power factor is leading. The voltage waveforms shown in FIGS. 5a, 5c and 5d have not changed from those shown in FIGS. 3 and 4. The current square waves are displaced so that the short voltage pulse v does not coincide with the non-inverted current square wave input to gate G1 shown in FIG. 5c but does coincide with the inverted current square wave input to gate G2 shown in FIG. 5d. The output of NAND gate G2 is a zero pulse which changes the output of NAND gate G4 of latch L to logic 1 and that of gate G3 to logic 0. Inasmuch as the output of gate G3 of latch L is now near zero potential, reed relay x operates and closes its contacts X1 which completes the energizing circuits to auxiliary relays Y and Z. Operation of the auxiliary relays Y and Z may switch the tap changer motor leads and the control sensing transformer to a source potential transformer for reverse power flow regulation.

The logic 0 output from NAND gate G3 is fed back to the B input of NAND gate G4 of latch L to keep logic 1 on the output of gate G4 and thus maintain this state of the latch circuit L. The output from NAND gate G3 of the latch circuit is also fed back through a resistance R9 to the non-inverting input of operational amplifier 21 to provide a positive bias on the input of current amplifier 21 which insures that the reverse flow detector indicates forward power flow for low, or no load current on the regulator and also establishes hysteresis in the circuit so that the detector will switch positively when the direction of power flow reverses.

Preferably operational amplifiers 12 and 21 are both embodied in a dual operational amplifier, low offset, integrated circuit such as sold by Motorola Incorporated under the type designation MC 1437L, and such integrated circuit substantially increases the sensitivity, the reliability, and the operating temperature range for the reverse power flow detector of the invention in comparison to known transistorized devices. Further, the four NAND gates G1–G4 are preferably embodied in a single integrated circuit with four 2-input NAND gates such as the type MC 648L sold by Motorola Incorporated.

In comparison to known transistorized power factor relays utilizing discrete transistors, the high-gain, low-offset monolithic operational amplifiers 12 and 21 result in: (1) a lower threshold of circuit operation at low load currents, and (2) increased phase accuracy of the sine-to-square wave conversion which permits operation of the disclosed relay at lower power factor. A typical transistor circuit utilized in known power factor relays such as a Schmitt trigger circuit may have an offset voltage of approximately 1.6 volts whereas, in contrast, the disclosed monolithic operational amplifiers 12 and 21 have an offset voltage of approximately 10 millivolts and an open loop circuit gain of approximately 15000.

Inasmuch as current operational amplifier 21 is biased preferentially through resistance R9 to indicate positive power flow so that the amplifier output is always positive for no input signal, the sensitivity of the reverse power detector is only limited by the ability of the input current to overcome such bias at the time the voltage pulse occurs. With a 1000 to 1 load current transformer 10, the disclosed reverse power flow detector has a minimum sensitivity of less than 1 percent of rated current (200A) in the range of 0.5 lead to 0.5 lag.

It should be understood that I do not intend to be limited to the particular embodiment shown and described for many modifications thereof will be obvious to those skilled in the art.

The embodiments of the invention in which an exclusive property or privilege is claimed are defined as follows:

1. A reverse power flow detector for indicating the direction of power flow in an alternating current electrical power line comprising, in combination,
   means coupled to said electrical power line for deriving a voltage signal indicative of the voltage on said power line,
   means coupled to said electrical power line for deriving a current signal indicative of the current flowing in said power line,
   means coupled to said voltage signal deriving means for shifting the phase of said voltage signal through a predetermined angle,
   means coupled to said phase shifting means for deriving a voltage pulse at the leading edge of the positive half cycle of the phase-shifted voltage signal,
   means coupled to said current signal deriving means for deriving a first rectangular current pulse from the half cycle of one polarity of said current signal,
   means coupled to said first rectangular current pulse deriving means for deriving a second rectangular current pulse which is shifted 180° in phase from said first rectangular current pulse, and
   logic means coupled to said voltage pulse deriving means and to said first current pulse deriving means and also to said second current pulse deriving means for providing a first output when said voltage pulse coincides with said first rectangular current pulse and for providing a second output when said voltage pulse coincides with said second rectangular current pulse.

2. A reverse power flow detector in accordance with claim 1 wherein said means for deriving a voltage pulse includes high gain amplifier means for shaping said voltage signal into a rectangular wave, diode means coupled to said high gain amplifier means for passing half cycles of one polarity of said rectangular wave, and differentiating means coupled to said diode means for generating said voltage pulse at the leading edge of said half cycle of one polarity of said rectangular wave.

3. A reverse power flow detector in accordance with claim 1 wherein said means for deriving a voltage pulse includes a first high gain operational amplifier, said means for deriving a first rectangular current pulse includes a second high gain amplifier, and said detector includes an integrated circuit element which incorporates both said first and said second operational amplifiers.

4. A reverse power flow detector in accordance with claim 1 wherein said logic means includes first NAND gate means receiving said voltage pulse and said first rectangular current pulse as inputs and second NAND gate means receiving said voltage pulse and said second rectangular current pulse as inputs.

5. A reverse power flow detector in accordance with claim 4 wherein said logic means also includes a latch circuit receiving the outputs of said first and second NAND gate means as inputs.

6. A reverse power flow detector in accordance with claim 1 wherein said means for deriving a first rectangular current pulse includes a high gain amplifier in series with a diode.

7. A reverse power flow detector in accordance with claim 1 wherein said means for deriving a first rectangular current pulse includes a high gain operational amplifier and positive feedback means from the output of said logic means to the input of said operational amplifier for biasing said operational amplifier so that its output is positive when no current flows in said power line.

8. A reverse power flow detector in accordance with claim 1 wherein said means for deriving a first rectangular current pulse includes a high gain operational amplifier in series with a diode,
said logic means includes first NAND gate means receiving said voltage pulse and said first rectangular current pulse as inputs, second NAND gate means receiving said voltage pulse and said second rectangular current pulse as inputs, and a latch circuit receiving the outputs of said first and second NAND gate means as inputs, and
positive feedback means from said latch circuit to the input of said operational amplifier for biasing said operational amplifier so that its output is positive when no current flows in said power line.

9. A reverse power flow detector for indicating direction of power flow in an alternating current electrical power line comprising, in combination,
means coupled to said electrical power line for deriving voltage and current signals indicative respectively of the voltage on and the current in said power line,
means coupled to said voltage signal deriving means for shifting the phase of said voltage signal approximately 90°,
a dual amplifier integrated circuit embodying first and second operational amplifiers,
means coupled to said phase shifting means and including said first operational amplifier for deriving a rectangular voltage pulse from the positive half cycle of said voltage signal,
differentiating means coupled to said rectangular voltage pulse deriving means for generating a sharp voltage pulse at the leading edge of said rectangular voltage pulse,
means coupled to said current signal deriving means and including said second operational amplifier for deriving a first rectangular current pulse from the positive half cycle of said current signal,
means coupled to said first current pulse deriving means for deriving a second rectangular current pulse shifted 180° from said first rectangular current pulse, and
logic means coupled to said differentiating means and to said first rectangular pulse deriving means and also to said second rectangular pulse deriving means for providing a first output when said sharp voltage pulse coincides with said first rectangular current pulse and for providing a second output when said sharp voltage pulse coincides with said second rectangular current pulse.

10. A power flow detector in accordance with claim 9 including a four NAND gate integrated circuit embodying first, second, third, and fourth NAND gates and wherein said logic means includes said first NAND gate receiving said voltage pulse and said first rectangular current pulse as inputs, said second NAND gate receiving said voltage pulse and said second rectangular current pulse as inputs, and a latch circuit including said third and fourth NAND gates and wherein said third NAND gate receives as inputs the output of said first and fourth NAND gates and said fourth NAND gate receives as an input the output of said second NAND gate.

11. A reverse power flow detector for indicating the direction of power flow in an alternating current power line comprising, in combination,
means coupled to said power line for deriving voltage and current signals indicative of the voltage on and the current in said power line,
means coupled to said voltage signal deriving means for shifting the phase of said voltage signal approximately 90°,
means coupled to said phase shifting means and including a first high gain operational amplifier and a diode for deriving rectangular voltage pulses from the positive half cycles of said phase-shifted voltage signal,
differentiating means coupled to said diode for generating a sharp voltage pulse at the leading edge of each said rectangular voltage pulse,
means coupled to said current signal deriving means and including a second high gain operational amplifier and a diode for deriving first rectangular current pulses from the positive half cycles of said current signal,
means coupled to said first current pulse deriving means for deriving second rectangular current pulses which are shifted 180° in phase from said first rectangular current pulses,
logic means including first NAND gate means receiving said sharp voltage pulses and said first rectangular current pulses as inputs for providing a first output when said sharp voltage pulses coincide with said first rectangular current pulses, thereby indicating that said power flow is in the forward direction, and second NAND gate means receiving said sharp voltage pulses and said second rectangular current pulses as inputs for providing a second output when said sharp voltage pulses coincide with said second rectangular current pulses, thereby indicating that the power flow is in the reverse direction, and positive feedback means from said logic means to said second high gain operational amplifier for biasing said second operational amplifier positive when no current flows in said power line.

* * * * *